July 12, 1966 K. J. WELLS 3,260,332
SPOT TYPE DISC BRAKES
Filed Nov. 23, 1962 7 Sheets-Sheet 7
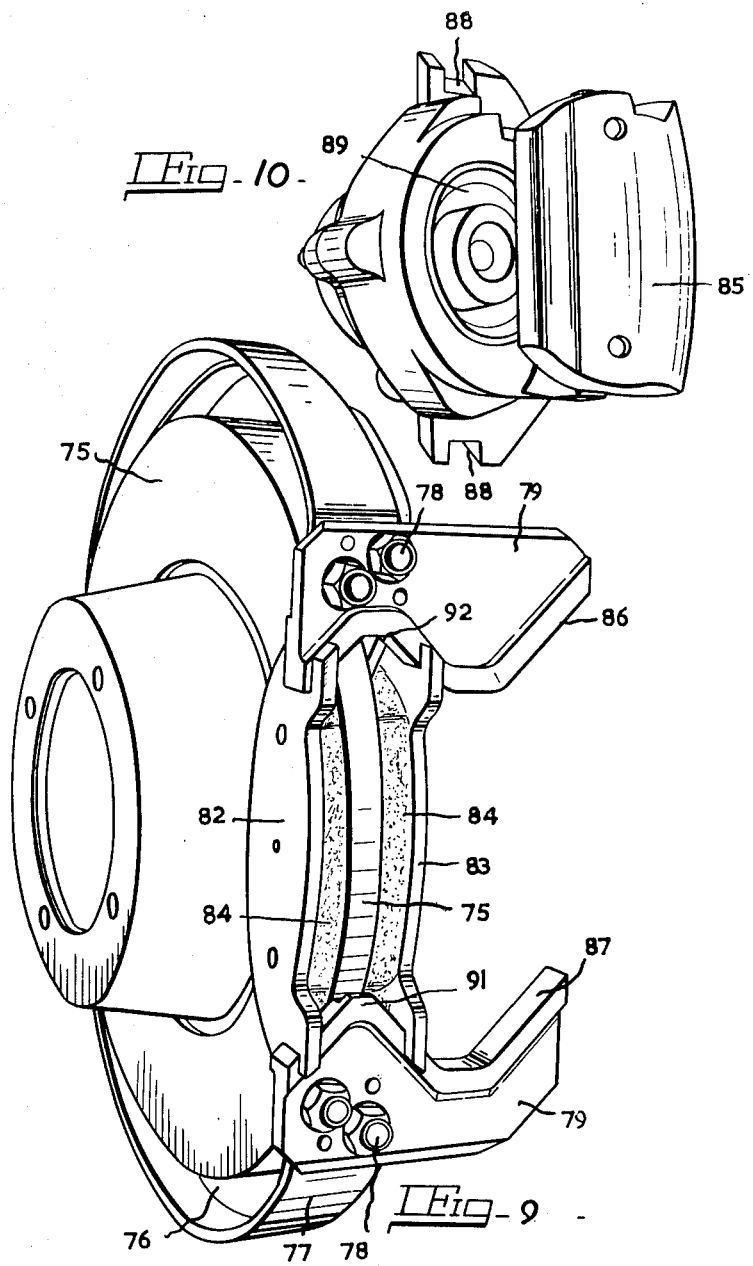

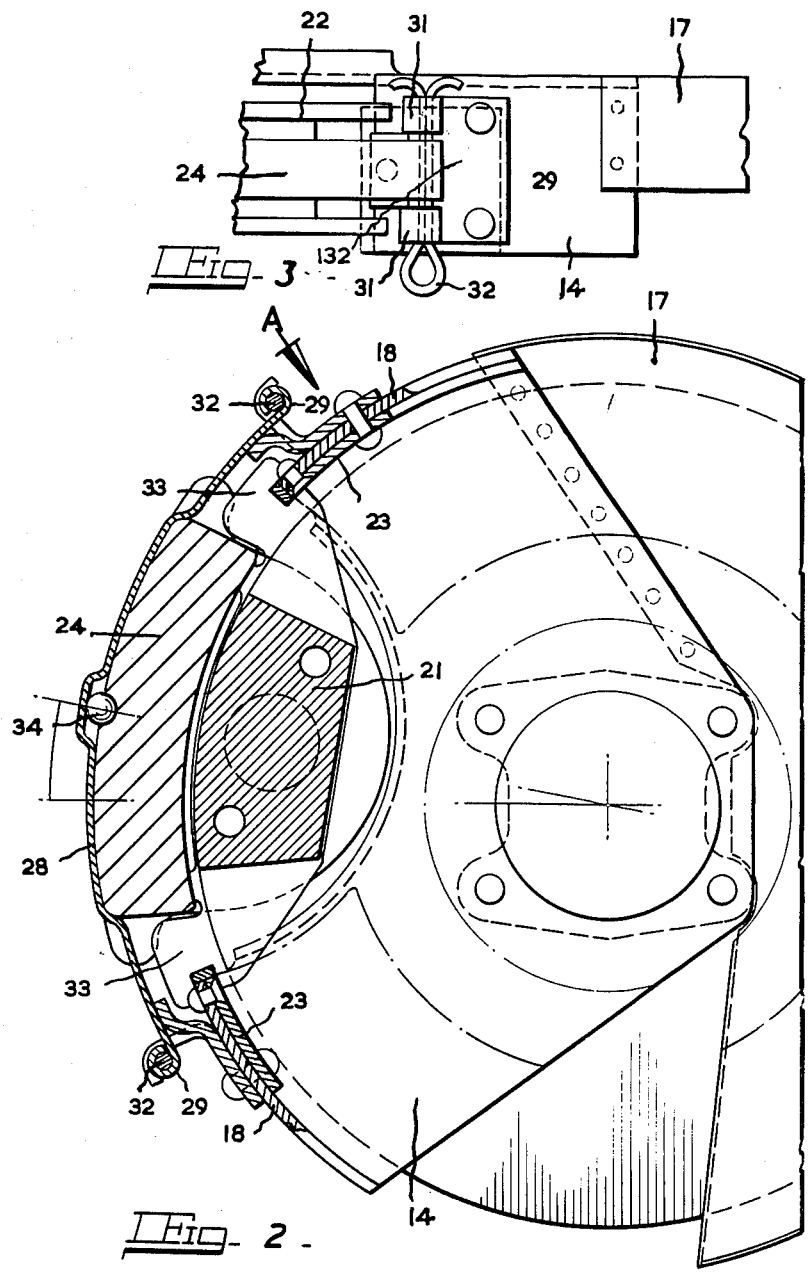

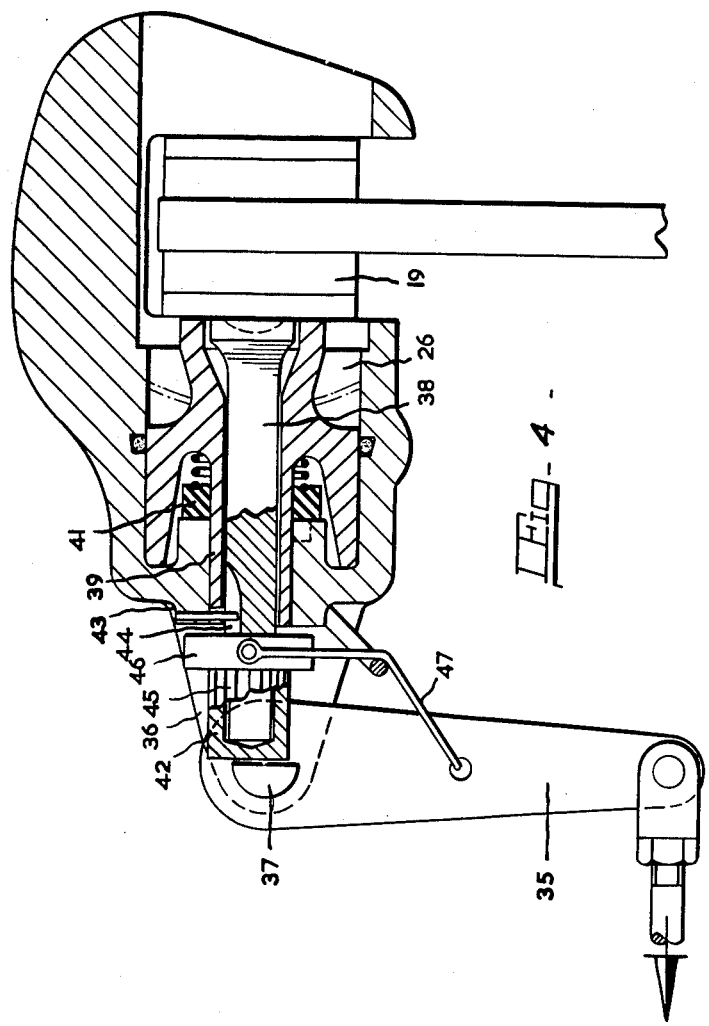

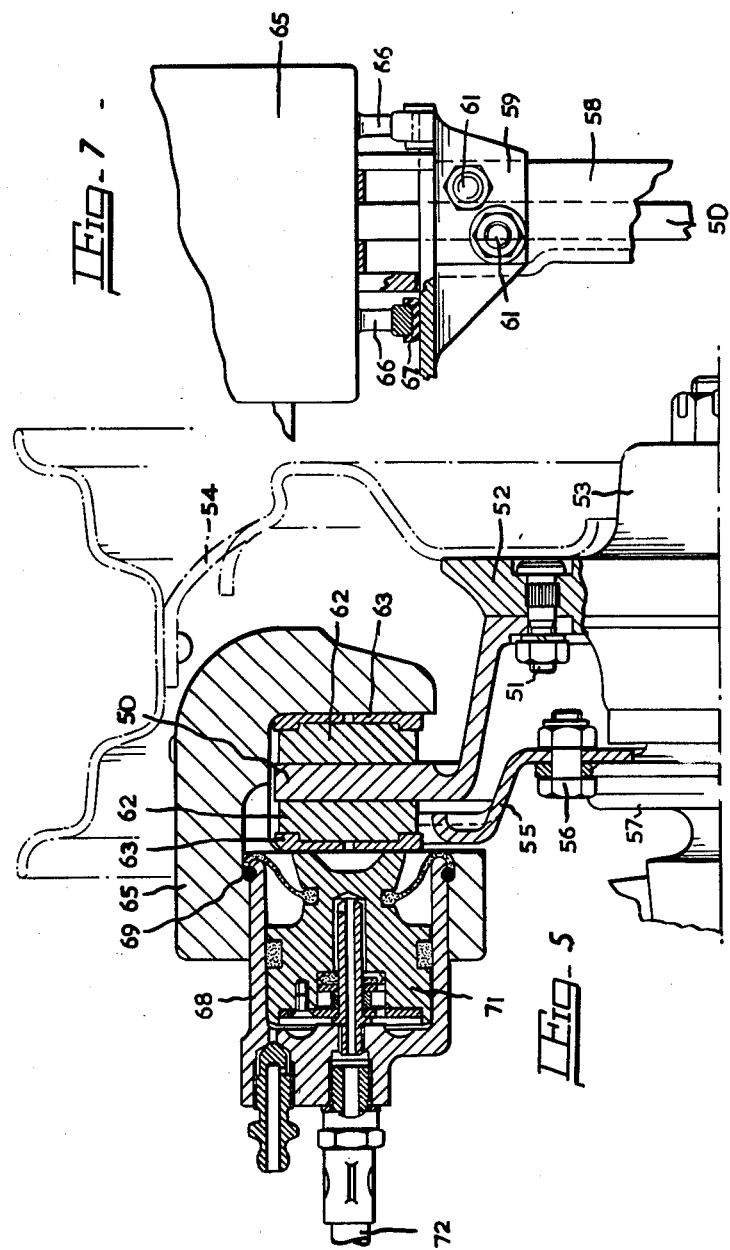

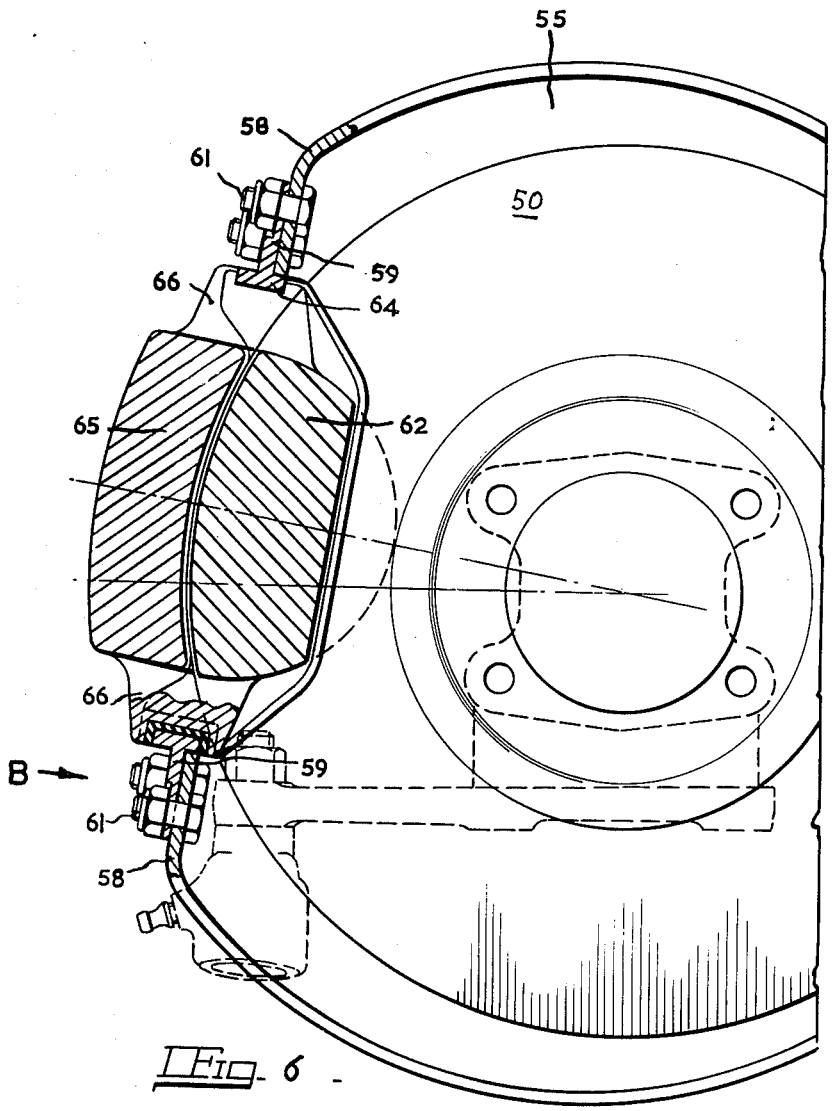

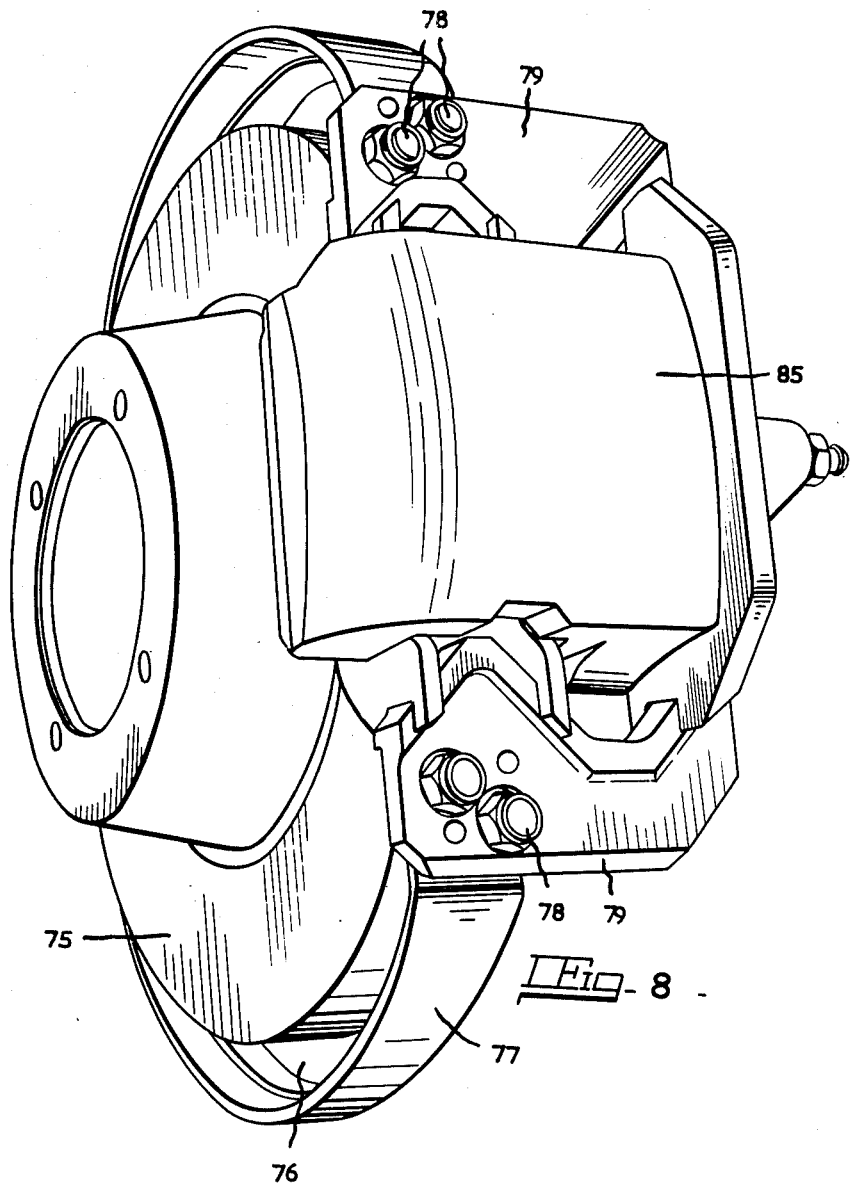

United States Patent Office 3,260,332
Patented July 12, 1966

3,260,332
SPOT TYPE DISC BRAKES
Kenneth John Wells, Castle Bromwich, England, assignor to Girling Limited, Birmingham, England, a British company
Filed Nov. 23, 1962, Ser. No. 240,209
Claims priority, application Great Britain, Nov. 23, 1961, 41,880/61; Mar. 21, 1962, 10,789/62; June 30, 1962, 25,189/62
6 Claims. (Cl. 188—73)

This invention relates to improvements in disc brakes of the kind in which friction pads are adapted to be urged by hydraulic or other means into engagement with opposite faces of a rotatable disc or discs.

According to my invention, in a disc brake of that kind the friction pads are removably mounted in a stationary torque-taking member and are adapted to be applied to the disc by means located in or carried by a clamping member which is removable from the assembly independently of the friction pads which can be left in situ when the clamping member is removed.

The clamping member straddles the friction pads and the portion of the disc with which they engage, and an hydraulic cylinder and piston assembly for applying the friction pads may be located in each limb of the clamping member.

Alternatively, there may be a cylinder and piston assembly in one limb only of the clamping member in which case the clamping member is permitted a limited movement in an axial direction relative to the disc.

Means may also be incorporated for applying the friction pads mechanically from a hand lever or the like.

Three forms of disc brake embodying my invention are illustrated by way of example in the accompanying drawings in which:

FIGURE 2 is an end view of the brake in part section;

FIGURE 3 is a fragmentary view looking in the direction of the arrow A in FIGURE 2;

FIGURE 4 is a section similar to FIGURE 1 but showing means for applying the brake manually as well as hydraulically;

FIGURE 5 is a vertical section of the upper half of another form of brake in a plane contaning the axis of the disc;

FIGURE 6 is an end view partly in section of the brake shown in FIGURE 5;

FIGURE 7 is a fragmentary view looking in the direction of the arrow B in FIGURE 6;

FIGURE 8 is a perspective view of another form of brake providing a self-energising or servo action;

FIGURE 9 is a perspective view of the brake shown in FIGURE 8 without the clamping members; and FIGURE 10 is a perspective view of the clamping member.

Figure 1:
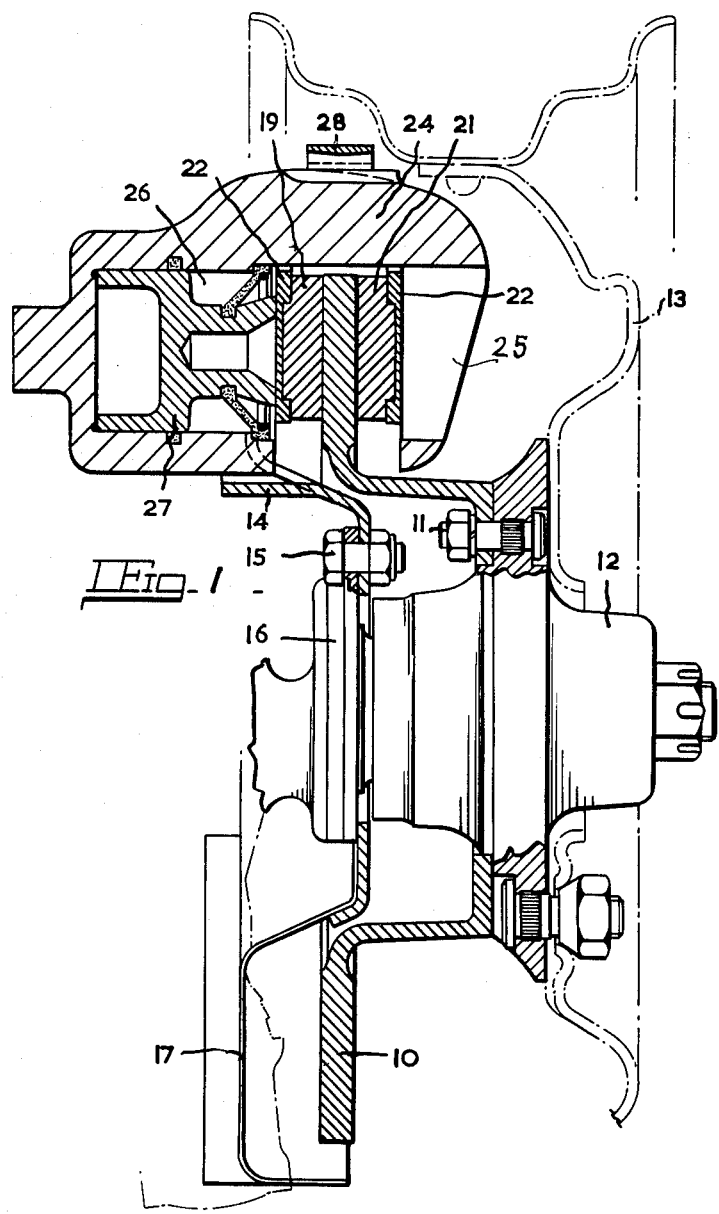
FIGURE 1 is a vertical section of one form of brake in a plane containing the axis of the disc.

In the brake illustrated in FIGURES 1 to 3, 10 is a disc secured by bolts 11 to a rotatable hub 12 adapted to carry a road wheel indicated at 13. A sector-shaped dished pressing 14 which form a torque-taking member is secured by bolts 15 to a stationary flange 16 adjacent to the disc.

The pressing 14 covers a portion of the inboard surface of the disc and the remainder may be covered by a light dustshield 17 carried by the pressing. The outer part of the pressing is radial and is offset to the inboard side of the disc, and on its outer edge there is an axially extending flange 18 on each side of a central gap in the pressing. The flange lies outside and is concentric with the periphery of the disc.

Friction pads 19, 21 adapted to engage opposite faces of the disc are bonded or otherwise secured to rigid backing plates 22 of which the ends are slidably engaged with the flange 18 on each side of the gap, the flange guiding the pads for movement towards and away from the disc and taking the torque on the friction pads when the brake is applied. Preferably the ends of the flange with which the backing plates engage are reinforced by steel strips 23 or riveted, welded or otherwise secured to the inner surface of the flange.

The ends of the backing plates 22 are notched as shown in FIGURE 2 for engaging slidably with the ends of the flange, so that the backing plates must be moved in an axial direction to effect the engagement, but the flange on the side next to the radial part of the pressing may be cut away to allow the backing plate on that side to be inserted radially and then moved axially.

Alternatively, the backing plates may simply have lugs on each end engaging the outer surface of the flange so that the backing plates can be inserted radially, outward movement of the backing plates being prevented by the clamping member when that is in position as described below.

The clamping member 24 is a U-shaped casting or forging which is received in the gap in the torque-taking member and straddles the backing plates and pads and the portion of the discs with which the pads engage. The outboard limb 25 of the clamping member has a flat radial inner surface which engages directly with the backing plate of the friction pad 21 on that side. An hydraulic cylinder 26 is formed in the other limb, and a piston 27 working in the cylinder engages with the backing plate of the adjacent friction pad 19. The clamping member 24 is free to move axially, so that when fluid under pressure is forced into the cylinder the piston 27 applies the pad 19 to the disc and the reaction on the clamping member moves it axially to bring the other pad 21 into engagement with the opposite face of the disc.

The clamping member 24 is retained in position by a curved spring strip 28 of which the ends are detachably anchored to the flange of the torque-taking pressing on each side of the gap and the intermediate part bears on the radially outermost surface of the clamping member. The ends of the spring strip are curled round to form eyes 29 co-operating with eyes 31 formed in fittings 132 secured to the flange on each side of the gap, cotter pins 32 being passed through the eyes and being readily removable when it is desired to remove the clamping member from the assembly. The spring strip normally presses the clamping member inwardly against abutments 33 on the radially outermost edges of the backing plates to locate the clamping member against inward movement and prevent outward movement of the friction pads.

Preferably anti-friction balls or rollers 34 are located between the spring retaining strip 28 and the clamping member 24 with the object of reducing to a minimum the frictional resistance offered to axial movement of the clamping member. The reason for that is that when the brake is released, lack of truth in the disc or in its running tends to knock back the directly actuated friction pad 19 and the piston 27. If the piston is displaced rearwardly in the cylinder, fluid is forced out of the cylinder and has to be replaced by additional movement of the brake pedal on the next application of the brake. However, if the frictional resistance of the clamping member to axial movement is less than that of the friction pad and piston, it is the clamping member which moves and there is little or no movement of the piston in the cylinder and hence a minimum displacement of fluid.

In assembling the brake the backing plates 22 carrying the friction pads are inserted first and are engaged with the ends of the flange on each side of the gap. The clamping member 24 is then placed in position and the spring strip 28 is fitted to retain the clamping member which in turn retains the backing plates and pads against outward radial movement.

It it is desired to operate the brake mechanically from a hand-brake lever or the like, the arrangement shown in FIGURE 4 can be employed.

In this arrangement a lever 35 is pivotally mounted between lugs 36 extending axially from the limb of the clamping member containing the hydraulic cylinder 26 and carries a cam 37 engaging the outer end of a plunger 38 which passes through an axial bore in the piston 27 which is formed with a cylindrical rearward extension 39 working through a bore in the rear end of the cylinder and sealed by a seal 41. The inner end of the plunger 38 bears directly on the backing plate of the friction pad 19.

For automatic adjustment to compensate for wear of the friction pads, the cam 37 engages with a cap nut 42 screwed on to the outer end of the plunger 38 which is keyed against angular movement by a pin 43 engaging in a longitudinal groove 44 in the plunger. Ratchet teeth 45 on the nut are engaged by a pawl tooth in a member 46 which is rotatable on the nut and is coupled by a resilient wire 47 to the lever 35 so that the nut is rotated step-by-step when the angular movement of the lever in applying the brake is such that the pawl is moved through an angle greater than the angular spacing of the ratchet teeth 45.

In the brake illustrated in FIGURES 5, 6 and 7, 50 is the brake disc which is secured by bolts 51 to a flange 52 on the hub 53 of a wheel 54. On the inboard side of the disc there is a circular torque-taking plate 55 in the form of a rigid sheet metal pressing secured by bolts 56 to a flange on the stationary stub axle 57 in the case of a front wheel or the axle housing in the case of a rear wheel. The plate 55 covers the inboard side of the disc and forms a dirt shield for the disc, and at one point the plate has a radial gap in its perpihery to house the brake mechanism. An axially extending flange 58 is formed on the plate at each end of the gap and abutments 59 having parallel faces are detachably secured by bolts 61 to these flanges.

Friction pads 62 adapted to engage opposite faces of the disc are bonded or otherwise secured to rigid backing plates 63 of which the ends engage the abutments 59 which take the torque on the friction pads when the brake is applied and guide the pads and backing plates for movement towards and away from the disc. Preferably the ends of the backing plates are formed as shown with rectangular notches slidably engaging with complementary parts 64 of the abutments as shown in FIGURE 6.

The friction pads are applied to the disc by a floating clamping member comprising a caliper 65 which straddles the friction pads and backing plates and is located within the gap in the plate 55 in which it is freely movable in an axial direction. The caliper may be of aluminium or light alloy and is located by bosses 66 on its ends which engage with the abutments 59 and which are fitted with rubber pads 67 to cushion vibration.

The inboard limb of the caliper has a bore parallel to the axis of the brake to receive a cast-iron or other hydraulic cylinder 68 which is secured in position by a steel ring 69 located in co-operating grooves in the bore and cylinder.

A piston 71 working in the cylinder applies the inboard friction pad to the disc when fluid under pressure is forced into the outer end of the cylinder through a pipe line 72, and the reaction on the cylinder moves the caliper axially to force the outboard friction pad into engagement with the disc. When the friction pads have to be replaced the bolts 61 securing the abutments 59 in place are removed and the clamping member and the friction pads with their backing plates can then be removed in a radial direction.

The piston 71 may incorporate any convenient form of automatic retraction and adjusting device.

In a modification the torque-taking plate 55 may be of sector shape, the remainder of the inboard side of the disc being covered by a light sheet metal dirt shield secured to the plate.

In the brake illustrated in FIGURES 8, 9 and 10, the rotatable disc 75 has at one side of it a stationary torque-taking member 76 which comprises a circular plate parallel to the disc and having an axially extending peripheral flange 77 of a diameter substantially greater than that of the brake disc. The flange and plate are cut away at one point to accommodate the brake assembly, and on opposite sides of the gap the flange presents two co-planar surfaces lying in a plane at right angles to a radius of the disc bisecting the gap.

Secured to these surfaces by bolts 78 are opposed torque-taking guides 79, providing inclined guiding surfaces for backing plates 82, 83 to which friction pads 84 are bonded and for a clamping member 85 which straddles the friction pads and backing plates. The corresponding surfaces on the two giudes are parallel to each other but are inclined with respect to the axis of the brake. One pair of surfaces 86, 87 is displaced to one side of the brake disc and co-operates with complementary inclined circumferentially spaced surfaces 88 in notches in an extension of a limb of the clamping member which houses an hydraulic piston and cylinder assembly 89 for applying the adjacent pad 84 to the disc.

The other two pairs of guiding surfaces combine to form respectively a V-shaped projection 91 and a V-shaped recess 92 on opposite sides of the gap in the torque plate, the apices of the projection and recess lying in the plane of the brake disc. The inclined sides of the projection and recess form guides for the backing plates 82, 83 of the friction pads, the backing plate 82 of the non-actuated pad moving axially and circumferentially in the same direction as the clamping member when the friction pads tend to be carried round with the brake disc on the application of the brake, while the backing plate of the directly actuated pad 83 moves axially in the opposite direction and circumferentially in the same direction. Thus the torque on the pads produces a servo action which urges both of them into closer engagement with the disc.

One advantage of the construction described above is that the volume of liquid under pressure required for the application of the brake is kept to a minimum as the clamping member follows the pads in their circumferential movement as well as their axial movement. It will be appreciated that the torque-taking and clamping functions are quite separate, the torque having a circumferential reaction which is taken by the torque-taking plate while the clamping reaction is a force tending to separate the limbs of the clamping member. The clamping member is not subjected to the additional reaction due to the servo action produced by the inclined guiding surfaces when the brake is applied, so that there is a minimum distortion of the clamping member and a minimum increase in the volume of liquid required to maintain the application of the brake, and a servo action approaching the maximum theoretical value can be obtained.

I claim:

1. A disc brake comprising a rotatable disc, braking surfaces on opposite sides of the disc, a stationary torque-taking plate adjacent to one side of the disc, said plate having an outer peripheral edge part extending radially beyond the periphery of the disc and having a gap in said edge part, said plate also having a stationary guiding member on each side of said gap positioned wholly radially beyond the periphery of said disc and extending axially and freely across the plane of the disc beyond the other side thereof, all parts of said guiding members being wholly radially outwardly of the periphery of said disc, braking pads on opposite sides of the disc including rigid backing plates having opposite ends in direct sliding engagement with said guiding members for movement towards and away from the disc, said guiding member taking the torque on the braking pads when the latter are applied to the disc, a rigid clamping member straddling said friction pads and being movable away from said gap entirely independently of said friction pads, releasable means cooperating with said plate and said clamping member for slidably supporting said clamping member for movement in an axial direction with respect to the disc, and means carried by said clamping member for applying at least one of said braking pads to said disc.

2. The disc brake of claim 1 wherein said clamping member is slidably supported on said friction pads, and a releasable latch means is connected at its opposite ends to said plate and extends over said gap in sliding relationship with said clamping member, release of said latch means enabling said clamping member to be removed radially away from said gap independently of said braking pads.

3. A disc brake comprising a rotatable disc, braking surfaces on opposite sides of the disc, a stationary torque-taking plate adjacent to one side of the disc, said plate having an outer peripheral edge part extending radially beyond the periphery of the disc and having a gap in said edge part, said plate also having a stationary guiding member on each side of said gap positioned wholly radially beyond the periphery of said disc and extending axially and freely across the plane of the disc beyond the other side thereof, all parts of said guiding members being wholly radially outwardly of the periphery of said disc, braking pads on opposite sides of the disc including rigid backing plates having opposite ends in direct sliding engagement with said guiding members for movement towards and away from the disc, said guiding member taking the torque on the braking pads when the latter are applied to the disc, a rigid clamping member straddling said friction pads and slidably supported on said guiding members independently of said braking pads, releasable means cooperating with said plate and said clamping member for retaining said clamping member in sliding engagement with said guiding members means, release of said releasable means enabling said clamping member to be removed in a radial direction away from said gap and independently of said friction pads, and means carried by said clamping member for applying at least one of said braking pads to said disc.

4. The disc brake of claim 3 wherein said releasable means comprise fastening elements detachably securing said guiding members to said plate.

5. A disc brake as in claim 4 wherein said clamping member is a rigid caliper incorporating hydraulic and mechanical means for applying at least one of the friction pads to the disc.

6. A disc brake as in claim 4 wherein said friction pads are removable from the torque-taking member in a radial direction after removal of the clamping member.

References Cited by the Examiner

UNITED STATES PATENTS

| 2,533,186 | 12/1950 | Bricker et al. | 188—73 |
| 2,940,547 | 6/1960 | Butler | 188—152 |
| 2,966,964 | 1/1961 | Brueder | 188—73 |
| 3,081,843 | 3/1963 | Dotto et al. | 188—73 |

FOREIGN PATENTS

| 565,708 | 3/1958 | Belgium. |
| 1,227,386 | 3/1960 | France. |
| 1,270,684 | 7/1961 | France. |
| 879,412 | 10/1961 | Great Britain. |

OTHER REFERENCES

Korner et al., German printed application, T8545 II/63C, May 24, 1956.

German printed application 1,078,886, Mar. 31, 1960.

MILTON BUCHLER, *Primary Examiner.*

ARTHUR L. LA POINT, EUGENE G. BOTZ, FERGUS S. MIDDLETON, *Examiners.*

G. E. A. HALVOSA, *Assistant Examiner.*